(12) United States Patent
Fein et al.

(10) Patent No.: US 8,319,773 B2
(45) Date of Patent: Nov. 27, 2012

(54) METHOD AND APPARATUS FOR USER INTERFACE COMMUNICATION WITH AN IMAGE MANIPULATOR

(76) Inventors: Gene S. Fein, Lenox, MA (US); Eli A. S. Merritt, Lenox, MA (US); Edward Merritt, Lenox, MA (US)

( * ) Notice: Subject to any disclaimer, the term of this patent is extended or adjusted under 35 U.S.C. 154(b) by 0 days.

(21) Appl. No.: 13/049,684

(22) Filed: Mar. 16, 2011

(65) Prior Publication Data

US 2012/0038547 A1    Feb. 16, 2012

Related U.S. Application Data

(63) Continuation of application No. 11/932,450, filed on Oct. 31, 2007, now abandoned.

(51) Int. Cl.
*G06T 15/00* (2011.01)
(52) U.S. Cl. ......... 345/419; 345/156; 345/173; 345/420
(58) Field of Classification Search .................. None
See application file for complete search history.

(56) References Cited

U.S. PATENT DOCUMENTS

| | | | |
|---|---|---|---|
| 6,031,519 A | 2/2000 | O'Brien | |
| 6,211,848 B1 * | 4/2001 | Plesniak et al. | 345/156 |
| 6,377,238 B1 | 4/2002 | McPheters | |
| 6,611,786 B1 * | 8/2003 | Zhang et al. | 702/156 |
| 6,650,318 B1 | 11/2003 | Amon | |
| 7,054,045 B2 | 5/2006 | McPheters et al. | |
| 7,185,271 B2 | 2/2007 | Lee et al. | |
| 7,262,783 B2 | 8/2007 | Kramer et al. | |
| 7,538,746 B2 * | 5/2009 | Uhlhorn et al. | 345/8 |
| 7,881,901 B2 | 2/2011 | Fein et al. | |
| 2002/0070921 A1 | 6/2002 | Feldman | |
| 2005/0024324 A1 | 2/2005 | Tomasi et al. | |
| 2007/0055949 A1 * | 3/2007 | Thomas | 715/863 |
| 2009/0109175 A1 | 4/2009 | Fein et al. | |
| 2009/0113348 A1 | 4/2009 | Fein et al. | |
| 2009/0184851 A1 * | 7/2009 | Grego et al. | 341/31 |

* cited by examiner

*Primary Examiner* — Said Broome
(74) *Attorney, Agent, or Firm* — Hamilton, Brook, Smith & Reynolds, P.C.

(57) ABSTRACT

A system, and method for use thereof, for image manipulation. The system may generate an original image in a three dimensional coordinate system. A sensing system may sense a user interaction with the image. The sensed user interaction may be correlated with the three dimensional coordinate system. The correlated user interaction may be used to project an updated image, where the updated image may be a distorted version of the original image. The image distortion may be in the form of a twisting, bending, cutting, displacement, or squeezing. The system may be used for interconnecting or communicating between two or more components connected to an interconnection medium (e.g., a bus) within a single computer or digital data processing system.

25 Claims, 10 Drawing Sheets

METHOD AND APPARATUS FOR USER INTERFACE COMMUNICATION WITH AN IMAGE MANIPULATOR

RELATED APPLICATION(S)

This application is a continuation of U.S. application Ser. No. 11/932,450, filed Oct. 31, 2007 now abandoned.

The entire teachings of the above application(s) are incorporated herein by reference.

BACKGROUND OF THE INVENTION

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light, and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desktop. Holographic technology is only limited in size by the size of the component parts. By using holographic technology, images may be displayed multi-dimensionally, rather simply on a planar projection.

Currently, progress has been made in technologies that can enhance the capability and range of holographic media. Specifically, progress has been made in projects that employ multi-million mirror systems and, via companies that have designed specialized high speed and high capacity micro processors for specialized jobs, other than holographic systems. This technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124β HeNe laser, a 35 mW laser diode system utilizing different processing methods such as pyrochrome processing. Split beam techniques can also be used Multi H1 to Multi H2. Such configurations as 8×10, triethanolomine, from Linotronic 300 image setter film are also commonly utilized or a configuration with rear-illuminated for 30×40 cm reflection hologram, where a logo floats 18-inches in front of the plate.

SUMMARY OF THE INVENTION

Some user interfaces have adopted a multi-dimensional interface approach. For example, the "heliodisplay" of IO2 Technology, LLC of San Francisco, Calif. projects images into a volume of free space, i.e. into an aerosol mixture such as fog or a gas, and may operate as floating touchscreen when connected to a PC by a USB cable. However, with the heliodisplay, the image is displayed into two-dimensional space (i.e. planar). While the Heliodisplay images appear 3 dimensional ("3-D"), the images are planar and have no physical depth reference.

Unfortunately, these existing uses have certain limitations in distribution and deployment. For example, functionally, the heliodisplay is a two dimensional display that projects against a curtain of air, or even glass. While, the heliodisplay may give the appearance of 3-D, the images displayed and the interface are 2-D. As such, the heliodisplay is not a true 3-D holographic display, and thus the interface operates on a two-dimensional plane, not taking advantage of a full three dimensional coordinate system.

Accordingly, there is a need for an integrated User Interface that utilizes true 3-D technology to create a computing and multimedia environment where a user can easily navigate by touch, mouse, voice activation, or pointer system to effectively navigate the interface to raise the level of the user experience to a true 3-D environment, with the goal of attaining elements of the attenuated clarity, realism and benefits of that environment that match our day to day conventional interactions with the 3-D world. With voice activation a user may announce interface positions, or alter a holographic interface, via voice commands.

An embodiment of the present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a users evolving data and requests.

Embodiments of the invention provide a holographic user interface which transforms the computing environment to enable a 3-D holographic style user interface and display system. The system utilizes holographic projection technology along with programmed quadrant matrixes sensor field to create multiple methods to select and interact with data and user interface tools and icons presented in a holographic format. The system may be used for interconnecting or communicating between two or more components connected to an interconnection medium (e.g., a bus) within a single computer or digital data processing system.

In an example embodiment of the invention, a system and corresponding method for providing a 3-D user interface involves display images in a 3-D coordinate system. Sensors are configured to sense user interaction within the 3-D coordinate system, so that a processor may receive user interaction information from the sensors. The sensors are able to provide information to the processor that enables the processor to correlate user interaction with images in the 3-D coordinate system.

In another example embodiment of the invention, a system, and corresponding method, for manipulating an original image is presented. The system may include at least one sensor that may be configured to sense a user interaction with the image in a three dimensional coordinate system, a correlation unit that may be configured to correlate the user interaction with the three dimensional coordinate system, and a projecting unit that may be configured to project an updated image based on the correlated user interaction. The distortion may include twisting, bending, cutting, displacement, and squeezing. The updated image may be equivalent to the original image manipulated by a distortion. The original image and/or the updated image may be a holographic image.

The at least one sensor may be a laser sensor which may be configured to geometrically identify a position within the three dimensional coordinate system. The at least one sensor may be further configured to triangulate and/or quadrilate a position within the three dimensional coordinate system.

The projecting unit may be further configured to project the updated image by selecting a pre-recorded interference pattern based on the correlated data. The projecting unit may also be configured to project the updated image by projecting a generated interference pattern based on the correlated data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

The present invention, in accordance with one embodiment relates to the creation of a holographic user interface which transforms the computing environment to enable a three dimensional (3-D) holographic style user interface and display system. The system utilizes holographic projection technology along with programmed quadrant matrixes sensor field to create multiple methods to select and interact with data and user interface tools and icons presented in a holographic format.

Figure 1:
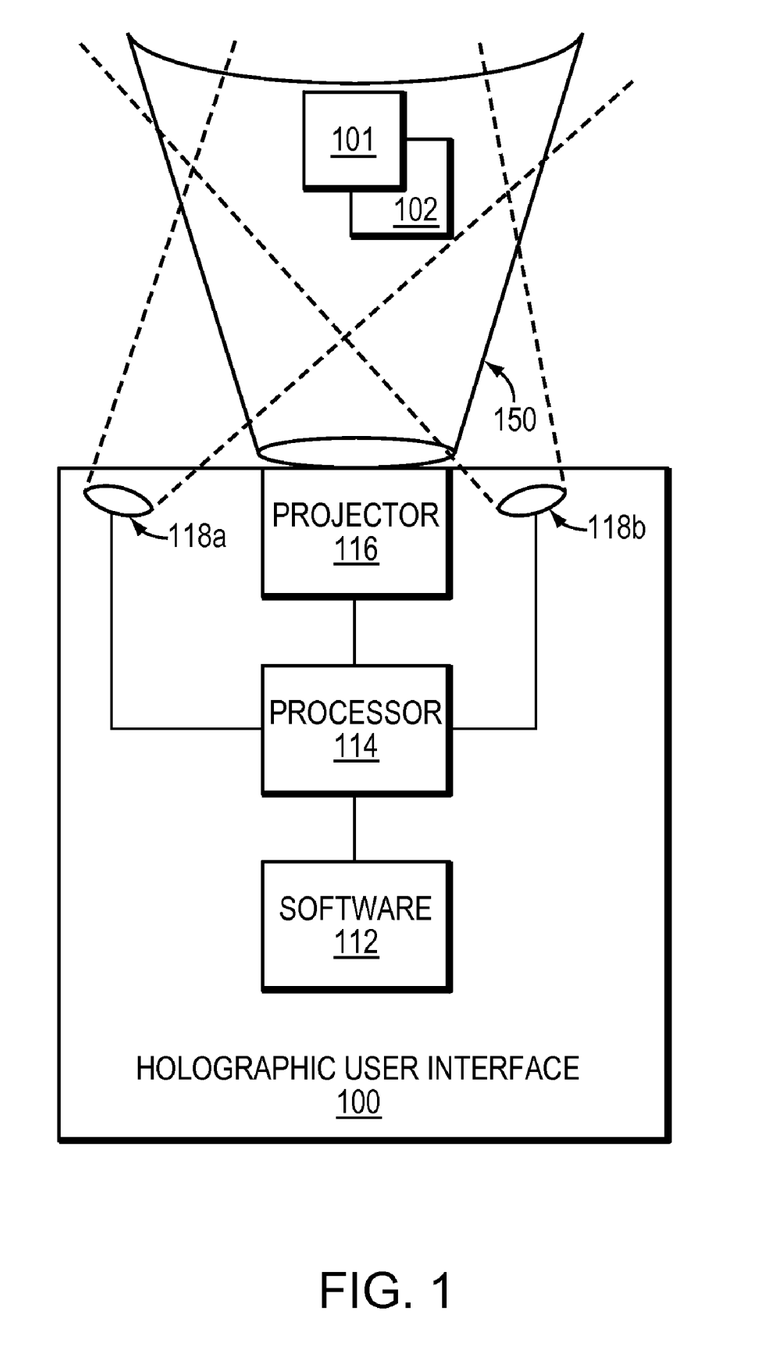
FIG. 1 is a block diagram illustrating a holographic user interface according to an example embodiment of the present invention.

FIG. 1 illustrates a holographic user interface 100 according to one example embodiment of the present invention. The holographic user interface 100 includes a processor 114 that operates software 112, controls a holographic image projector 116, and processes information obtained from sensors 118a, 118b. The projector may generate a 3-D display image 101, 102 within a 3-D coordinate system 150. The sensors 118a and 118b may be directed toward the 3-D coordinate system to sense a user interaction with images within the 3-D coordinate system. If a user were to interact with an image 101 or 102, the sensors 118a and 118b would provide coordinate information that the processor can correlate with the projected images 101 and 102 in the 3-D coordinate system. The sensed user interaction may include, but is not limited to, a sensed movement about the holographic image or a sensing of blocked light caused by a user "touching" the holographic image. Thermal and audio sensing may also be employed in the user interaction sensing.

Figure 2:
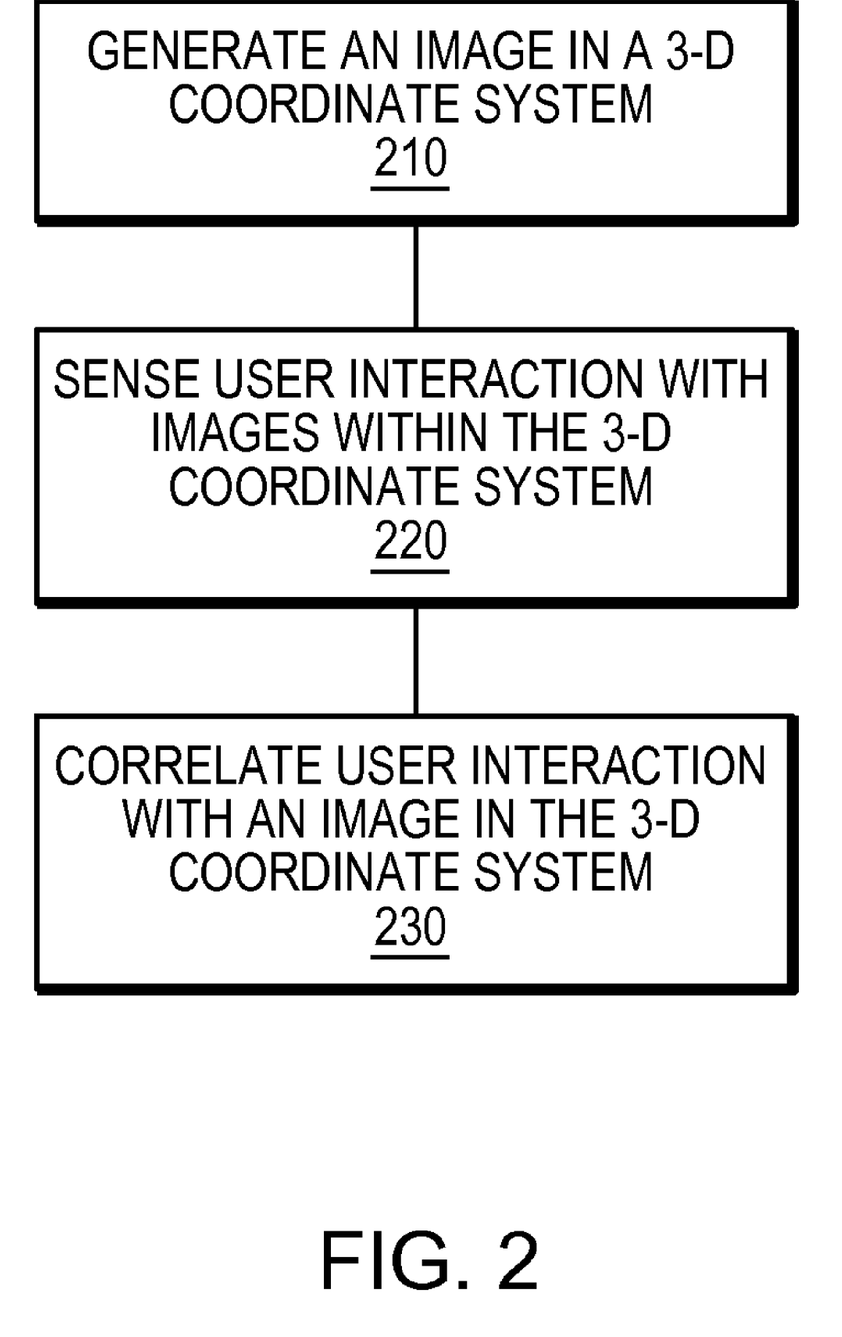
FIG. 2 is a flow chart diagram illustrating a method for providing a 3 dimensional (3-D) interface with a system according to an example embodiment of the present invention.

FIG. 2 is a flow chart that illustrates the method for providing a three dimensional (3-D) interface with a system. The interface generates (210) an image in a 3-D coordinate system. In operation, an embodiment of the interface deploys holographic information in the form of a user interface template as a default once turned on. Sensors on the interface sense (220) a user's interaction with the 3-D coordinate system. The sensing may occur through the use of matrixes or triangulated data points that correspond to specific functions and data display which the system is capable of displaying. The interface may then correlate (230) the user's interaction with an image in the 3-D coordinate system. By sensing and correlating interaction with the 3-D coordinate system, the interface allows a computer system or display to interact with a user. The holographic data displayed by the system becomes a result of a selection process by the user who triggers data being displayed by key strokes or by the use of a three dimensional interactive interface. Users location commands are read by the system at their exact points and then the system deploys the appropriate response or holographic media based upon the users specific request made via the location of that request.

Figure 3:
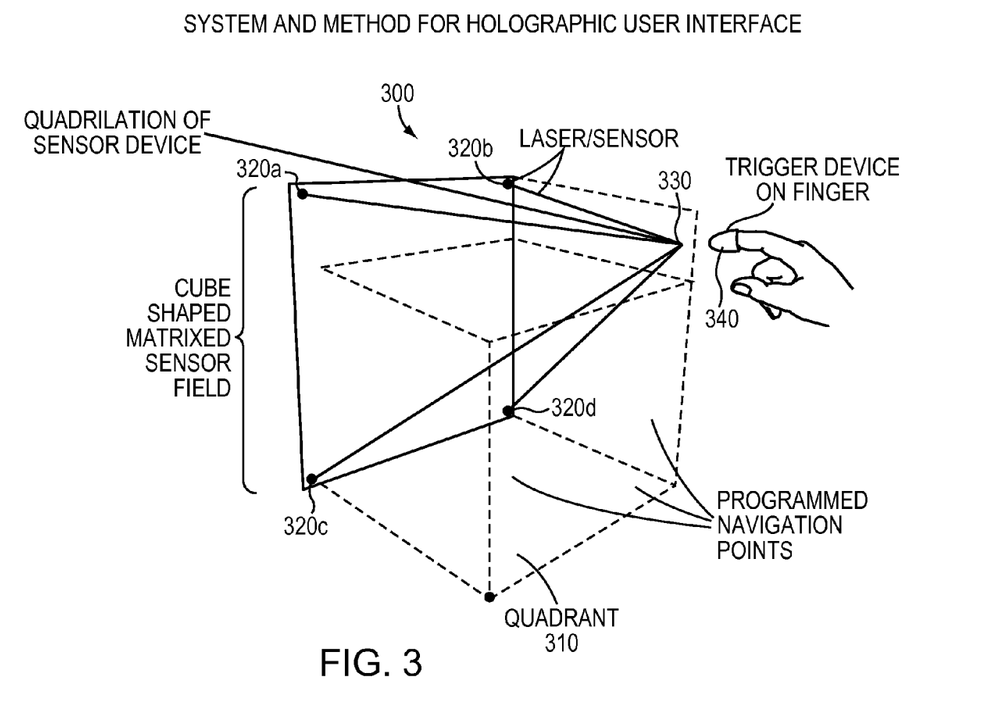
FIG. 3 is a perspective view of sensor field used in connection with an example embodiment of the present invention.

FIG. 3 illustrates a sensor field used in connection with embodiments of the present invention. The embodiment illustrated in FIG. 3 includes four laser sensors 320a-d. The manipulatable interface may be a relatable and interactive holographic media via the use of a sprocketed sensor system which deploys from the display either via a built in or retrofit hardware peripheral that creates a quadrilateral angle navigation system to determine the exact point 330 of a fingertip touch point 340 within a quadrant 310 (also referred to as a "3-D coordinate system"). This touch point, if effectively deployed by the user, is mapped to the image deployed by the holographic hardware and software system, as each image that is displayed in the system is displayed from an exact point at an exact place in space that has been preconfigured to match specific points on the quadrilateral sensor system. The points in space attached to programmed images are then matched to touch points made by the user. The touch point may trigger the same functions as a mouse and cursor.

One skilled in the art will recognize that other sensing configurations or devices may be used to sense a location within a 3-D coordinate system. For example, the sensors may be laser sensors configured to provide data to triangulate a point within the 3-D coordinate system, photo voltaic sensors, photo electric light sensors, or image sensors. The sensors may also be motion sensors, which may for example be detected to sense the motion of a user's hand within the 3-D coordinate system. The sensors may be programmed to identify the specific location of the touchpoint 330 that may extend through multiple planar images, to identify a single image located at a 3-D coordinate space.

Figure 4A:
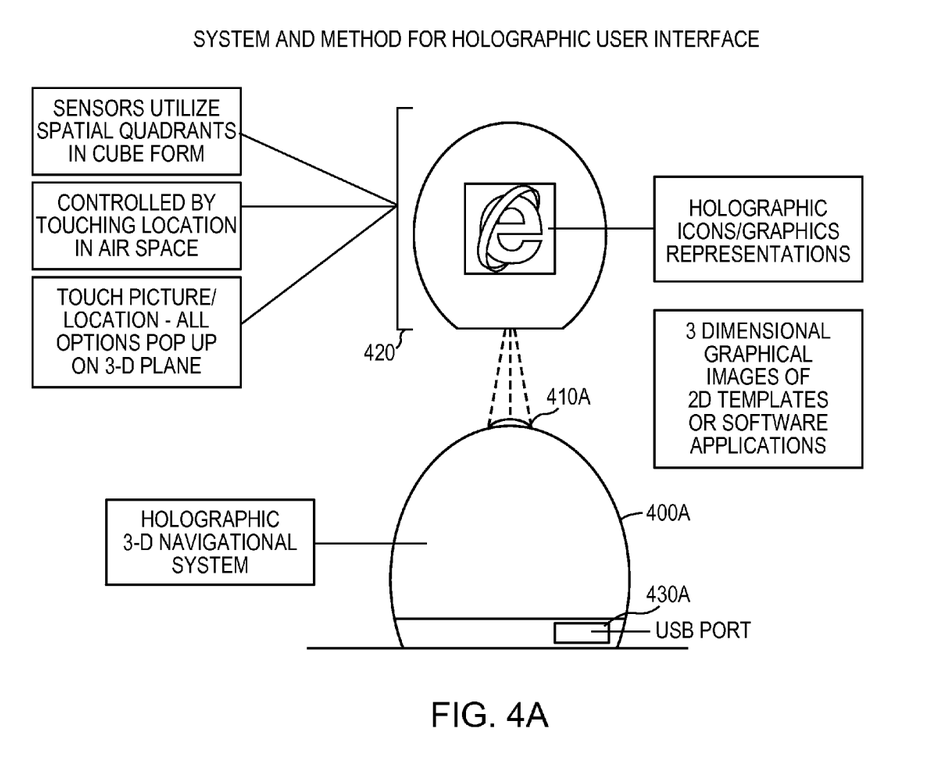
FIGS. 4A and 4B are front views of a holographic user interface device according to an example embodiment of the present invention.

FIG. 4A illustrates a holographic user interface device 400A according to one embodiment of the present invention. The device 400A has a port 410A that may provide the output projector for the multi-dimensional display, and also the sensors for detecting user interaction. The projector and sensors map out a 3-D coordinate system 420 to serve as the holographic user interface. A communications port 430A, such as a universal serial bus ("USB") port or wireless connection, serves to allow the device 400A to communicate with a computer system. The holographic system may be based upon our prior holographic system technology filing, filed Apr. 5, 2007, U.S. application Ser. No. 11/397,147, which is incorporated herein by reference in its entirety, where the User Interface icons and documents may be saved to a fixed media form and activated by commands sent from the operating system to the device managing the index on the holographic fixed media system and display. Similarly, any system that utilizes holographic displays may also be manipulated and selected using the sensor interface system.

Figure 4B:
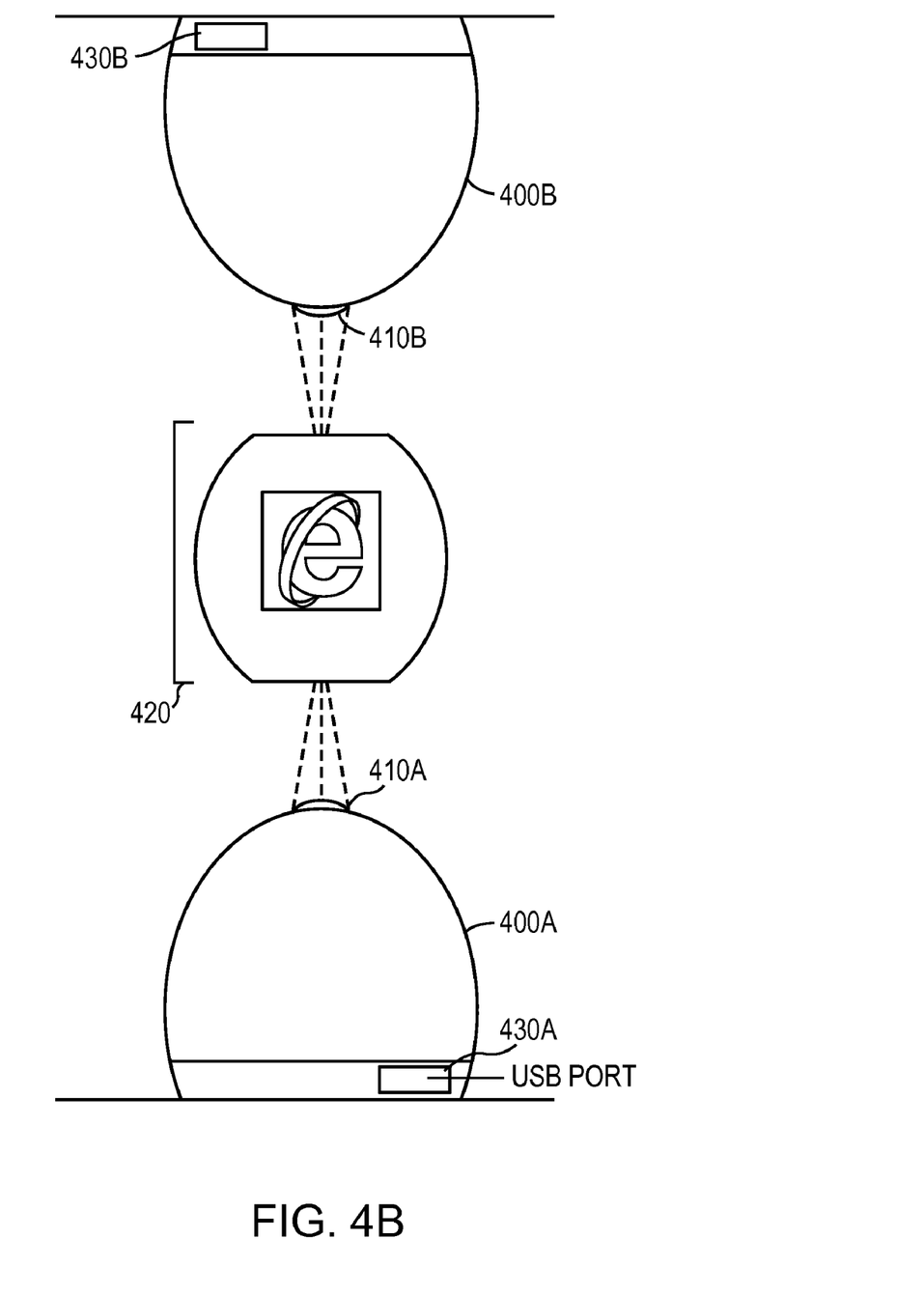

FIG. 4B illustrates holographic user interface devices 400A, as described in relation to FIG. 4A, and 400B. The holographic user interface device 400B may be identical to the holographic user interface device 400A, such that the device 400B may include ports 410B and 430B, and may be configured to provide a holographic image in the 3-D coordinate system 420. Multiple holographic user interface devices may be used to project a holographic image. For example, the user interface device 400A may be configured to project the holographic image from a desk or floor, while the second user interface device 400B may be configured to project the holographic image from a ceiling. If the port 410A of the first user interface device 400A is obstructed by a user or external object, the second interface device 400B may be used to reinforce the obstructed portion of the holographic image. Thus, the full holographic image may be viewed even in the presence of obstructions. It should be appreciated that any number of holographic user interface devices may be employed, and that any number of the user interface devices may be used to sense a user interaction. It should also be appreciated that although the second user interface device 400B has been illustrated in a 180° configuration with respect to the first user interface device 400A, any number of user interface devices may be included and the user interface devices may be offset by any distance or angle.

Figure 5:
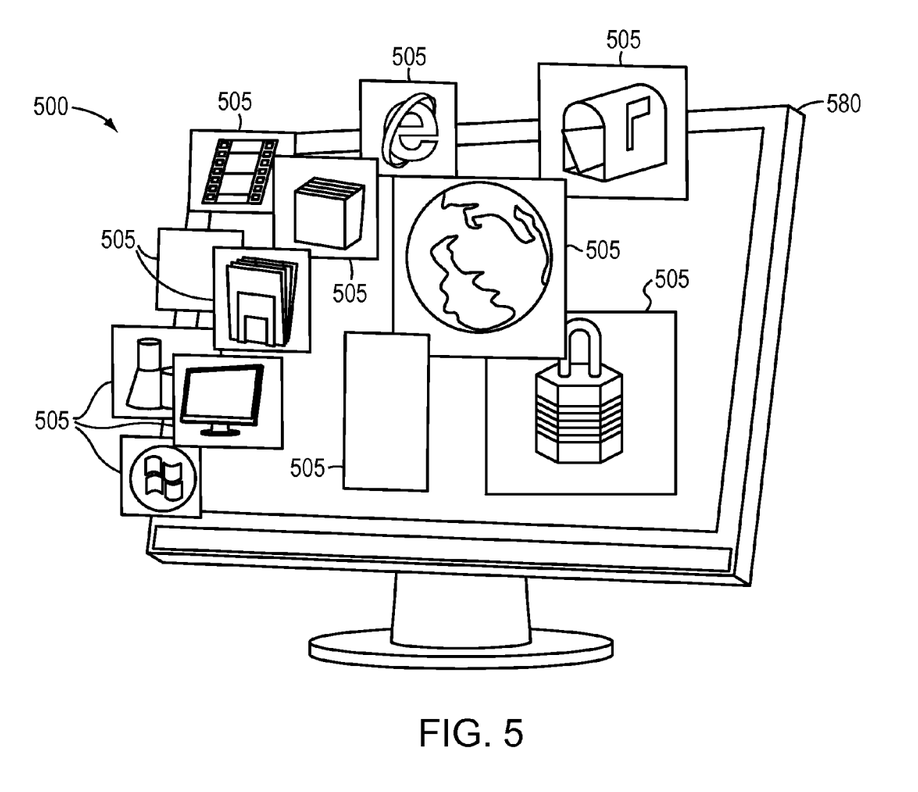
FIG. 5 is a perspective view of a diagram of a holographic user interface according to another example embodiment of the present invention.

FIG. 5 is a perspective view of a diagram of a holographic user interface 500 according to another embodiment of the present invention. The holographic user interface device may operate with a projection screen 580. Images 505 displayed by the projection screen 580 of the user interface 500 can include, but are not limited to, shapes, graphic images, animation sequences, documents, and audiovisual programs, which may be configured as a logical display featuring icons whose organization on the projection screen 580 may be based upon the users patterns of use with the system. Examples of user patterns with the system may include, but are not limited to, always going online first, always working on a word document second, and always viewing pictures or videos from the users hard drive. These icons could be presented, for example, to the user in an order of priority on the display representing the users evolving use habits based upon history (e.g., distinct changes based upon day, time, and date). These icons, which may include traditional UI operating system icons such as Word document icons and portable document format ("PDF") icons, may be presented in a holographic format. Documents may be revised and read through in a traditional manner or through a holographic view. Any displayed holographic item may revert back to the flat display monitor, or vice versa, based upon a user command.

Figure 6:
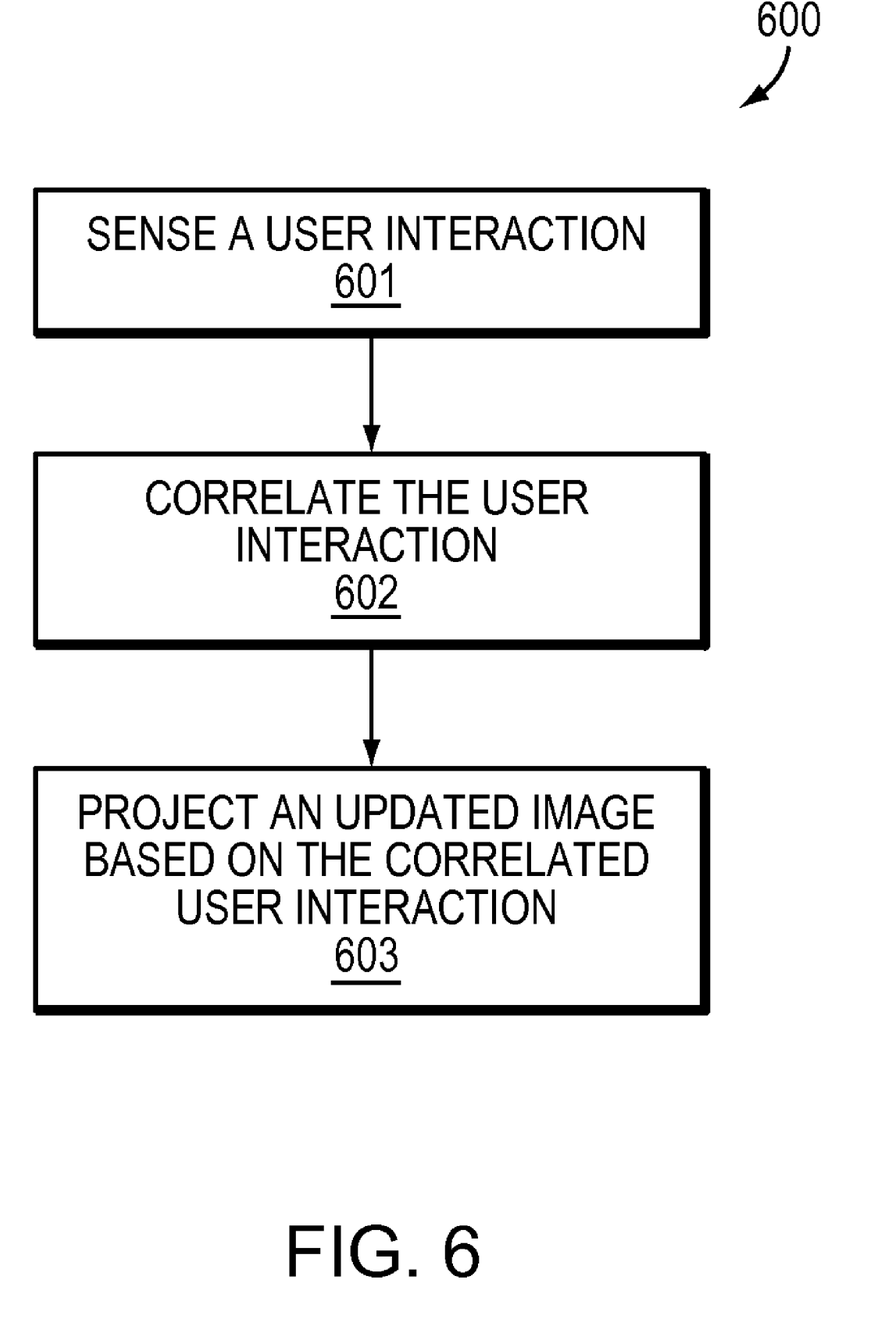
FIG. 6 is flow diagram depicting example operations of an image manipulation system according to an example embodiment of the present invention.
Figure 7:
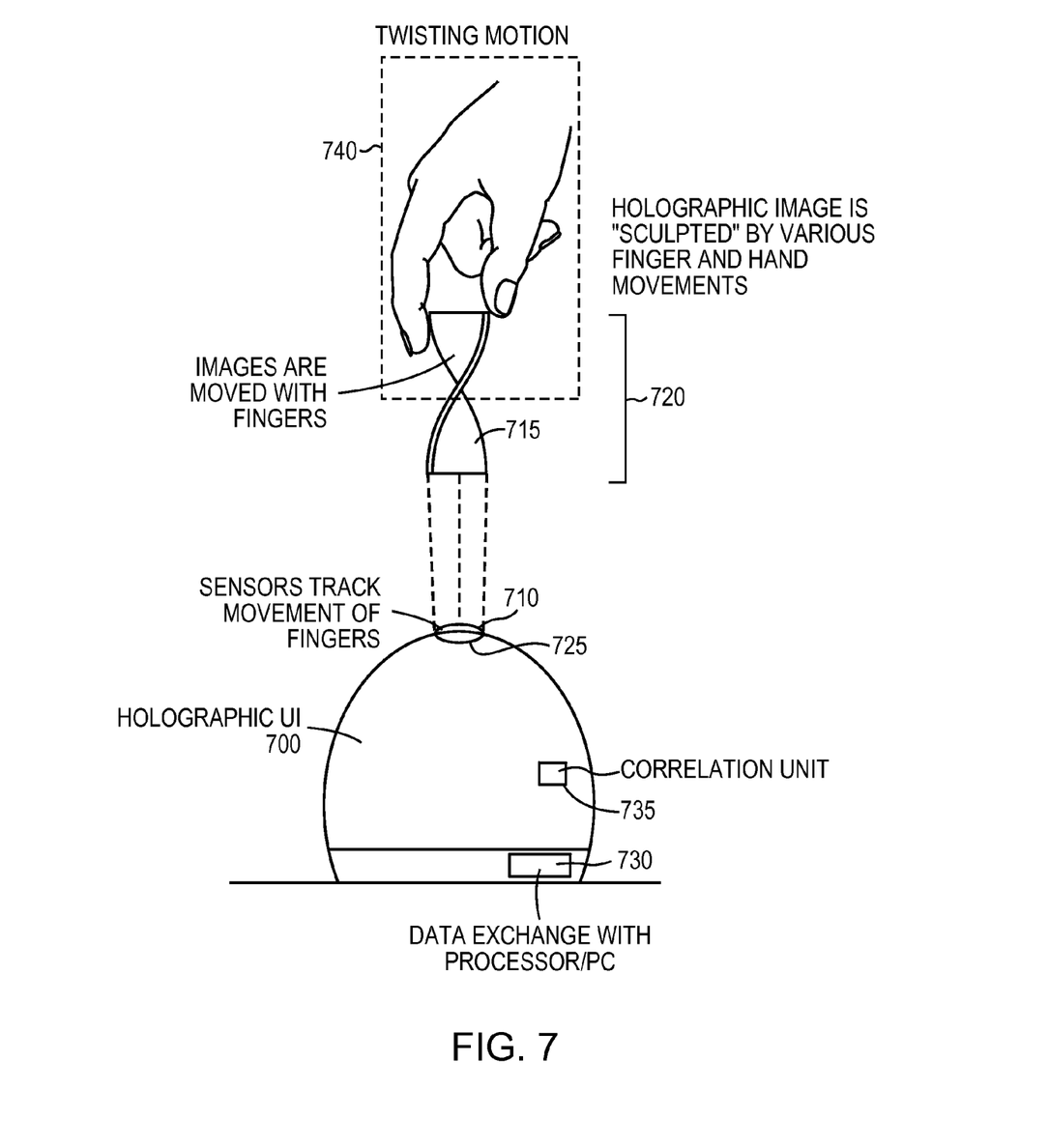
FIG. 7 is a schematic of an image manipulation system employing a twisting distortion in accordance to an example embodiment of the present invention.
Figure 8:
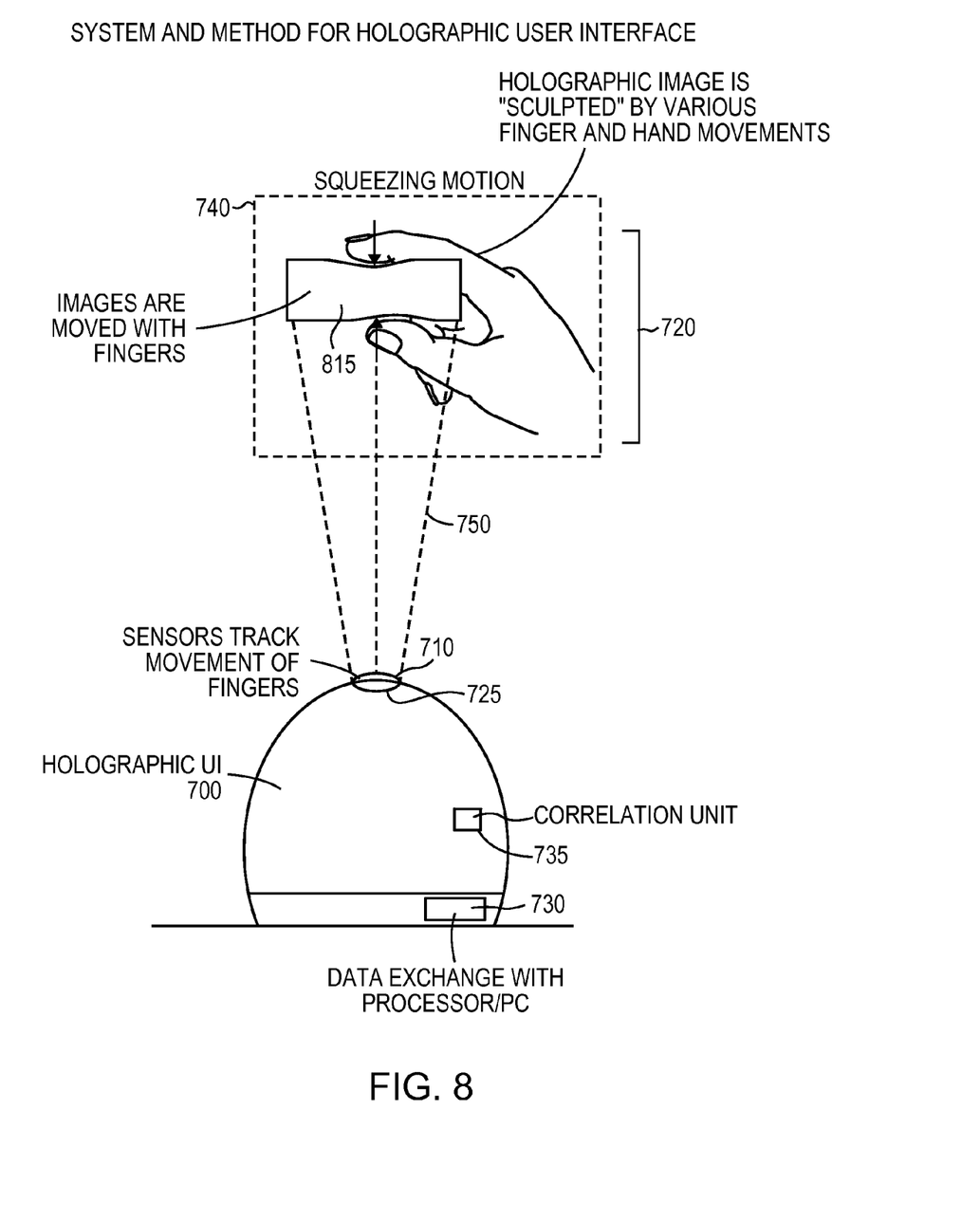
FIG. 8 is a schematic of an image manipulation system employing a squeezing distortion in accordance to an example embodiment of the present invention.
Figure 9:
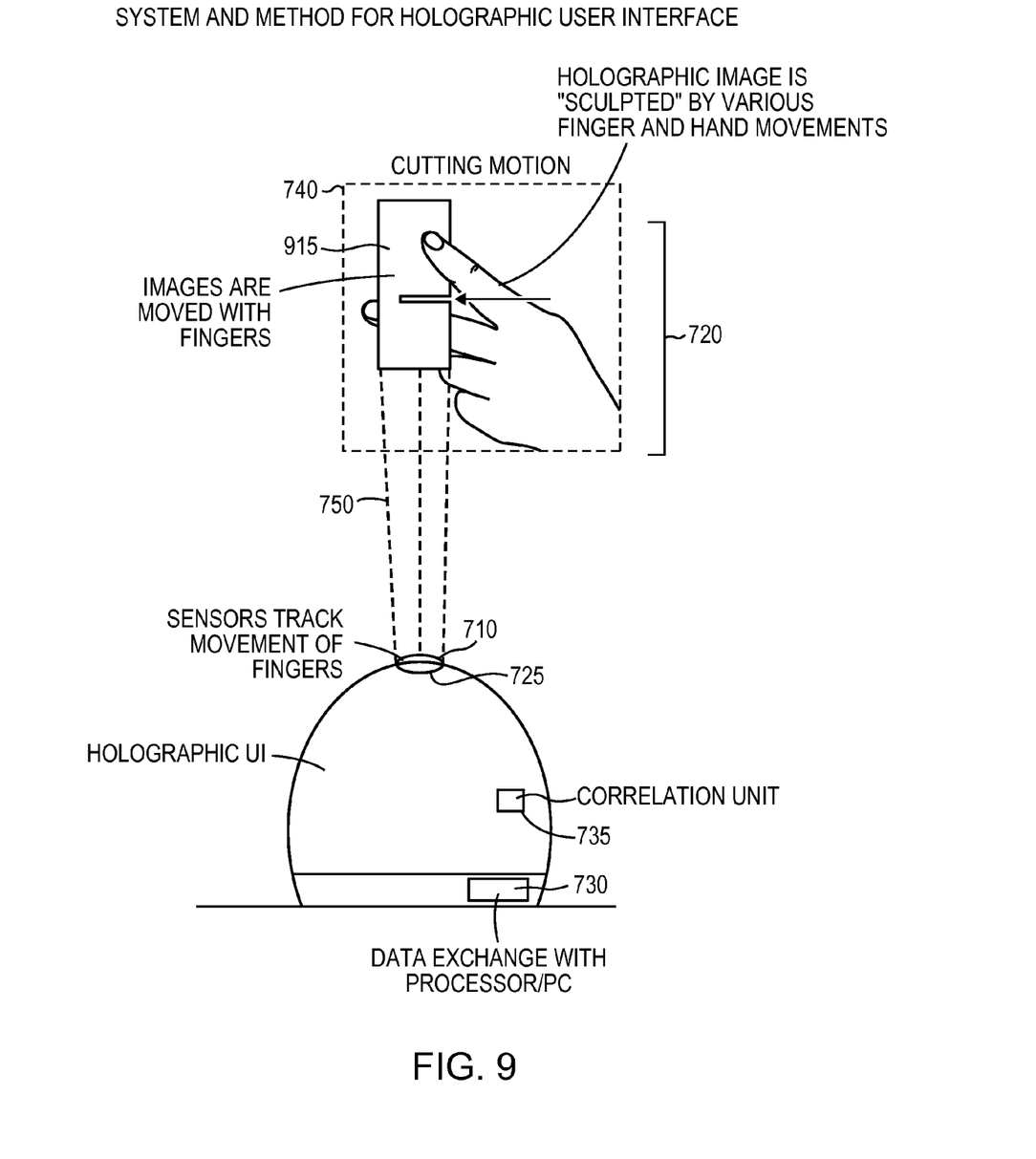
FIG. 9 is a schematic of an image manipulation system employing a cutting distortion in accordance to an example embodiment of the present invention.

It should be appreciated that the methods involved in providing a 3-D user interface system may be utilized by image manipulation systems. FIG. 6 is a flow diagram depicting example operations of an image manipulation system according to an example embodiment of the present invention. FIGS. 7-9 illustrate examples of image manipulation systems employing twisting, squeezing, and cutting distortions, respectively, according to example embodiments of the present invention.

The image manipulation system, as shown in FIG. 7 may include a holographic user interface system 700. The user interface 700, similarly to the user interface systems described in FIGS. 1-5, may include a projector 725 configured to project a holographic image 715 in a three dimensional (3-D) coordinate system 720. The user interface may also include sensors 710 that may be configured to sense a user interaction with the holographic image 715 which may be a 3-D image (601). The user interaction may be in the form of direct interaction, for example by a user's hand 740 interacting with the image 715. The user interaction may also be in the form of voice recognition, retinal scan, fingerprint matching, or any other known input means.

Once a user interaction has been detected, the sensed data may be correlated with respect to the 3-D coordinate system (602). This correlation may be performed by a correlation unit 735 which may be located in the user interface system 700. It should also be appreciated that the correlation may be performed externally (e.g., via a host computer, or any device connected through a network) by transmitting the sensed data through the data exchange port 730.

The correlation of data may be used to interpret an intended distortion of the image 715. For example, a user may attempt to grab the image with their hand and upon making a twisting motion with their wrist, the correlation unit may interpret the distortion as an axial rotation, where the entire image as a whole is rotated about a center longitudinal axis, or as a twist, where a portion of the image is rotated, as shown in FIG. 7. The correlation unit 735 may distinguish between the distortion of twist and rotation by, for example, recognizing predefined indicators. Examples of indicators may be, but are not limited to, vocal commands, hand positions, or any other known input means. Thus, the selection of a distortion based on correlated data may further be made by the use of at least one indicator.

Once the data has been correlated, the correlated data may be used to select a new image to be projected (603). The new projected image may be based on the original projected image having undergone the distortion, for example, FIG. 7 displays an image having under gone the distortion of twist. A new image may be projected during each stage of distortion, therefore the image may appear to a user as moving in real time as the user interacts with the image. Each possible position of the image may be stored in a fixed media, as for example the fixed media described in U.S. patent application Ser. No. 11/857,161 (herein incorporated by reference), where each position may be referenced to an interference pattern. The measured responses from the sensor may be used to determine which interference pattern is to be projected, in what order the interference patterns are to be projected, and at what rate the interference patterns should be projected. Thus, by projecting the interference pattern as dictated by the correlated data, the projection of the image may continuously change positions in accordance with the movement of the user's hand, or any form of interaction in the form of input. It should also be appreciated that the correlated data may also be used to generate an interference pattern with use of computer aided holography. A variable medium, for example a liquid crystal based medium, may be used for temporary storage of the computer generated interference pattern. Therefore, the distorted shape of the image, upon applying the twisting interference, may also be predetermined. It should be appreciated that the image may be twisted or rotated in any location and along any direction.

FIGS. 8 and 9 illustrate user interface systems similar to those discussed in FIGS. 1-7, and provide examples of squeezing and cutting distortions, respectively. Similarly to the example described in FIGS. 6 and 7, in the example shown in FIG. 8 a measured user interaction 740 may be correlated with the use of a correlation unit 735. The correlation unit may identify the squeezing by, for example, identifying an indicator of a user's fingers being in a pinching configuration. The correlated data may be used to select a new image to be projected. As shown in the example provided by FIG. 8, the user may distort the projected image by applying a squeezing distortion. The amount of distortion applied by the squeezing user interference may be predetermined by the interference patterns stored in the fixed media, or the computer generated interference patterns. Furthermore, the distorted shape of the image, upon applying the squeezing interference, may also be predetermined. It should be appreciated that the image may be squeezed in any location or along any direction.

In FIG. 9 an example of a cutting distortion is illustrated. A user interaction 740 may be correlated with the use of the correlation unit 735. The correlation unit may identify the cutting by, for example, by identifying an indicator of a user's fingers being in a scissor configuration. The correlated data may be used to select a new image to be projected. As shown in the example provided by FIG. 9, the user may distort the projected image by applying a cutting distortion. The amount of distortion applied by the squeezing user interference may be predetermined by the interference patterns stored in the fixed media, or the computer generated interference patterns. Furthermore, the distorted shape of the image, upon applying the cutting interference, may also be predetermined. It should be appreciated that the image may be cut in any location or along any direction.

In a similar manner, an image may also be displaced, for example a user may move an image side to side vertically or horizontally, and a user may also move the image backward or forward. An image may also be bent in any location of the image and along any direction. It should be appreciated that any form or type of image distortion known in the art may be applied. It should also be appreciated that any number of distortions may be applied to an image at a given time.

It should also be appreciated that image manipulation systems may be used in tandem with voice recognition, retinal scan, fingerprint matching, and standard input systems. It should also be appreciated that the at least a portion of the holographic image may become distorted as a result of a user input by means of voice recognition, retinal scan, fingerprint matching, or any other known input means. It should also be appreciated that any number of projection systems may be used in the authentication systems. Additionally, the sensors and/or correlation unit may be located externally from the user interface device. It should also be appreciated that any known 3-D imagery may be employed by the image manipulation system, for example volumetric imagery.

Those of ordinary skill in the art should recognize that methods involved in providing a 3-D user interface with a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1-9 or any other described embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of manipulating an original image through a user interface, the method comprising:

using one or more sensors coupled to a computer processor, sensing a user interaction with the original image in a three dimensional coordinate system, said sensing being based on quadrilateral angle navigation that determines a touch point position within the three dimensional coordinate system, wherein the original image is displayed from a certain point in space preconfigured to match specific points in the quadrilateral angle navigation and the certain point in space is matched to space location of the user interaction to determine the touch point, said sensing resulting in each sensor providing coordinate information to the computer processor enabling the computer processor to correlate with the original image in the three dimensional coordinate system;

in the computer processor, correlating the sensed user interaction with the three dimensional coordinate system; and from the computer processor through a projector, projecting an updated image based on the correlated user interaction, the updated image being equivalent to the original image manipulated by a distortion.

2. The method of claim 1 wherein the original image and/or the updated image is a holographic image.

3. The method of claim 1 wherein sensing includes using laser sensors to geometrically identify a position within the three dimensional coordinate system.

4. The method of claim 3 wherein using laser sensors to geometrically identify includes using laser sensors to triangulate and/or quadrilate a position within the three dimensional coordinate system.

5. The method of claim 1 wherein the distortion is any one or combination of:

twisting, bending, cutting, displacement, and squeezing.

6. The method of claim 1 further comprising selecting a distortion based on at least one indicator.

7. The method of claim 2 wherein projecting the updated image further includes selecting a pre-recorded interference pattern based on the correlated data.

8. The method of claim 2 wherein projecting the updated image further includes generating an interference pattern based on the correlated data.

9. A user interface system for manipulating an original image, the system comprising:

at least one sensor configured to sense, based on quadrilateral angle navigation to determine a touch point position within a three dimensional coordinate system, a user interaction with the image in the three dimensional coordinate system, wherein the original image is displayed from a certain point in space preconfigured to match specific points in the quadrilateral angle navigation, and the certain point in space is matched to space location of the user interaction to determine the touch point, each sensor providing coordinate information to a computer processor enabling the computer processor to correlate with the original image in the three-dimensional coordinate system;

a correlation unit executed by the computer processor and configured to correlate the sensed user interaction with the three dimensional coordinate system; and a projecting unit responsive to the correlation unit and configured to project an updated image based on the correlated user interaction, the updated image being equivalent to the original image manipulated by a distortion.

10. The system of claim 9 wherein the original image and/or the updated image is a holographic image.

11. The system of claim 9 wherein the at least one sensor is a laser sensor configured to geometrically identify a position within the three dimensional coordinate system.

12. The system of claim 11 wherein the at least one sensor is further configured to triangulate and/or quadrilate a position within the three dimensional coordinate system, 13. The system of claim 9 wherein the distortion is any one or combination of:
twisting, bending, cutting, displacement, and squeezing.

14. The system of claim 13 wherein the correlation unit is further configured to select the distortion based on at least one indicator.

15. The system of claim 10 wherein the projecting unit is further configured to project the updated image by selecting a pre-recorded interference pattern based on the correlated data.

16. The system of claim 10 wherein the projecting unit is further configured to project the updated image by projecting a generated interference pattern based on the correlated data.

17. A non-transient computer program product having a computer program stored thereon, the computer program defined by instructions which, when executed by a processor, cause the processor to:

sense a user interaction with the original image in a three dimensional coordinate system, said sensing being based on quadrilateral angle navigation to determine a touch point position within the three dimensional coordinate system, wherein the original image is displayed from a certain point in space preconfigured to match specific points in the quadrilateral angle navigation, and the certain point in space is matched to space location of the user interaction to determine the touch point, said sensing resulting in providing coordinate information to the processor such that the processor correlates the original image with the three-dimensional coordinate system;

correlate the sensed user interaction with the three dimensional coordinate system; and project an updated image based on the correlated user interaction, the updated image being equivalent to the original image manipulated by a distortion.

18. The program of claim 17 wherein the original image and/or the updated image is a holographic image.

19. The program of claim 17 wherein the instructions to sense a user interaction further include:
use laser sensors to geometrically identify a position within the three dimensional coordinate system.

20. The program of claim 17 wherein the instructions further include:
use laser sensors to triangulate and/or quadrilate a position within the three dimensional coordinate system.

21. The program of claim 17 wherein the distortion is any one of: twisting, bending, cutting, displacement, and squeezing.

22. The program of claim 21 wherein the instructions to correlate further include:
select the distortion based on at least one indicator.

23. The method of claim 18 wherein the instructions to project the updated image further include:
select a pre-recorded interference pattern based on the correlated data.

24. The method of claim 18 wherein the instructions to project the updated image further include:
generate an interference pattern based on the correlated data.

25. A user interface system for manipulating an original image, the system comprising:

means to sense a user interaction with the original image in a three dimensional coordinate system, said means to sense being based on quadrilateral angle navigation to determine a touch point position within the three dimensional coordinate system, wherein the original image is displayed from a certain point in space preconfigured to match specific points in the quadrilateral angle navigation, and the certain point in space is matched to space location of the user interaction to determine the touch point, said sensing means providing coordinate information enabling correlation of the original image with the three dimensional coordinate system;

means to correlate the sensed user interaction with the three dimensional coordinate system using the coordinate information provided by said sensing means; and means to project an updated image based on the correlated user interaction, the updated image being equivalent to the original image manipulated by a distortion.

* * * * *